(12) United States Patent
Yamagishi

(10) Patent No.: US 10,616,647 B2
(45) Date of Patent: Apr. 7, 2020

(54) TERMINAL APPARATUS, SERVER APPARATUS, INFORMATION PROCESSING METHOD, PROGRAM, AND LINKING APPLICATION SUPPLY SYSTEM

(71) Applicant: Saturn Licensing LLC, New York, NY (US)

(72) Inventor: Yasuaki Yamagishi, Kanagawa (JP)

(73) Assignee: Saturn Licensing LLC, New York, NY (US)

( * ) Notice: Subject to any disclaimer, the term of this patent is extended or adjusted under 35 U.S.C. 154(b) by 0 days.

(21) Appl. No.: 14/659,245

(22) Filed: Mar. 16, 2015

(65) Prior Publication Data

US 2015/0215673 A1 Jul. 30, 2015

Related U.S. Application Data

(63) Continuation of application No. 13/679,624, filed on Nov. 16, 2012, now Pat. No. 9,015,785.
(Continued)

(51) Int. Cl.
*H04N 21/462* (2011.01)
*H04N 21/643* (2011.01)
(Continued)

(52) U.S. Cl.
CPC ....... *H04N 21/4622* (2013.01); *H04L 65/607* (2013.01); *H04L 67/34* (2013.01);
(Continued)

(58) Field of Classification Search
CPC ......... H04N 21/23418; H04N 21/4394; H04N 21/44008; H04N 21/23892;
(Continued)

(56) References Cited

U.S. PATENT DOCUMENTS 7,028,327 B1 4/2006 Dougherty et al.
8,595,783 B2 11/2013 Dewa
(Continued)

FOREIGN PATENT DOCUMENTS

CN 101346741 1/2009
CN 102244788 A 11/2011
(Continued)

OTHER PUBLICATIONS

U.S. Appl. No. 13/216,375, filed Aug. 24, 2011, 2012-0063508, Hattori, et al.
(Continued)

*Primary Examiner* — Alexander Gee
(74) *Attorney, Agent, or Firm* — Oblon, McClelland, Maier & Neustadt, L.L.P.

(57) ABSTRACT

To execute applications in link with the progression of content being viewed at user's home.
A terminal apparatus practiced as one embodiment of the present disclosure has an extracting block configured to extract signature data indicative of features of content to be reproduced, a query generating block configured to generate a query that at least includes the above-mentioned extracted signature, a communication block configured to transmit the above-mentioned generated query to a server apparatus and receive a response returned by this server in response to the above-mentioned response, and an application executing block configured to obtain an application on the basis of an application URL (Uniform Resource Locator) in which at least application identification information is written, this URL being included in the above-mentioned received response, and execute the obtained application. The above-mentioned terminal apparatus practiced as one embodiment of the invention is applicable to TV receivers.

20 Claims, 14 Drawing Sheets

Related U.S. Application Data

(60) Provisional application No. 61/564,622, filed on Nov. 29, 2011.

(51) Int. Cl.
| | |
|---|---|
| *H04N 21/438* | (2011.01) |
| *H04N 21/239* | (2011.01) |
| *H04N 21/4722* | (2011.01) |
| *H04N 21/44* | (2011.01) |
| *H04L 29/06* | (2006.01) |
| *H04N 21/858* | (2011.01) |
| *H04L 29/08* | (2006.01) |
| *H04N 21/23* | (2011.01) |

(52) U.S. Cl.
CPC ......... *H04N 21/23* (2013.01); *H04N 21/2393* (2013.01); *H04N 21/438* (2013.01); *H04N 21/44008* (2013.01); *H04N 21/4722* (2013.01); *H04N 21/64322* (2013.01); *H04N 21/8586* (2013.01)

(58) Field of Classification Search
CPC ........... H04N 21/8358; H04N 21/2353; H04N 21/236; H04N 21/472; H04N 21/4622; H04N 21/8586; H04N 21/4722; H04N 21/4725; H04N 21/435; H04N 21/23; H04N 21/2393; H04N 21/438; H04N 21/64322; H04L 65/607; H04L 67/34
See application file for complete search history.

(56) References Cited

U.S. PATENT DOCUMENTS

| | | | |
|---|---|---|---|
| 8,705,933 B2 | 4/2014 | Eyer | |
| 8,839,338 B2 | 9/2014 | Eyer | |
| 8,842,974 B2 | 9/2014 | Kitazato | |
| 8,863,171 B2 | 10/2014 | Blanchard et al. | |
| 8,872,888 B2 | 10/2014 | Kitazato | |
| 8,875,169 B2 | 10/2014 | Yamagishi | |
| 8,875,204 B2 | 10/2014 | Kitazato | |
| 8,884,800 B1 | 11/2014 | Fay | |
| 8,886,009 B2 | 11/2014 | Eyer | |
| 8,896,755 B2 | 11/2014 | Kitazato et al. | |
| 8,898,723 B2 | 11/2014 | Eyer | |
| 8,904,417 B2 | 12/2014 | Kitahara et al. | |
| 8,908,103 B2 | 12/2014 | Kitazato | |
| 8,909,694 B2 | 12/2014 | Yamagishi et al. | |
| 8,914,832 B2 | 12/2014 | Yamagishi | |
| 8,917,358 B2 | 12/2014 | Eyer | |
| 8,918,801 B2 | 12/2014 | Kitazato et al. | |
| 8,925,016 B2 | 12/2014 | Eyer | |
| 8,930,988 B2 | 1/2015 | Kitazato et al. | |
| 8,938,756 B2 | 1/2015 | Kitazato | |
| 8,941,779 B2 | 1/2015 | Eyer | |
| 8,966,564 B2 | 2/2015 | Kitazato | |
| 9,374,620 B2 * | 6/2016 | Yamagishi | H04H 60/23 |
| 2007/0130581 A1 | 6/2007 | Del Sesto et al. | |
| 2007/0260634 A1* | 11/2007 | Makela | G11B 27/105 |
| 2007/0297666 A1 | 12/2007 | Takeuchi et al. | |
| 2008/0297654 A1 | 12/2008 | Verberkt et al. | |
| 2009/0055443 A1* | 2/2009 | Miyamoto | G06F 16/958 |
| 2009/0070797 A1* | 3/2009 | Ramaswamy | H04L 12/66 725/10 |
| 2010/0146287 A1* | 6/2010 | Kreiner | H04L 63/12 713/178 |
| 2010/0185765 A1 | 7/2010 | Kang et al. | |
| 2011/0088075 A1 | 4/2011 | Eyer | |
| 2011/0243536 A1 | 10/2011 | Eyer | |
| 2011/0246488 A1 | 10/2011 | Eyer | |
| 2011/0247028 A1 | 10/2011 | Eyer | |
| 2011/0298981 A1 | 12/2011 | Eyer | |
| 2011/0299827 A1 | 12/2011 | Eyer | |
| 2011/0302599 A1 | 12/2011 | Eyer | |
| 2011/0302611 A1 | 12/2011 | Eyer | |
| 2012/0047531 A1 | 2/2012 | Eyer | |
| 2012/0050619 A1 | 3/2012 | Kitazato et al. | |
| 2012/0050620 A1 | 3/2012 | Kitazato | |
| 2012/0054214 A1 | 3/2012 | Yamagishi et al. | |
| 2012/0054235 A1 | 3/2012 | Kitazato et al. | |
| 2012/0054268 A1 | 3/2012 | Yamagishi | |
| 2012/0060197 A1 | 3/2012 | Kitahara et al. | |
| 2012/0063508 A1 | 3/2012 | Hattori et al. | |
| 2012/0072965 A1 | 3/2012 | Dewa | |
| 2012/0081607 A1 | 4/2012 | Kitazato | |
| 2012/0082266 A1 | 4/2012 | Kitazato et al. | |
| 2012/0084802 A1 | 4/2012 | Kitazato | |
| 2012/0185888 A1 | 7/2012 | Eyer et al. | |
| 2012/0253826 A1 | 10/2012 | Kitazato et al. | |
| 2013/0024894 A1 | 1/2013 | Eyer | |
| 2013/0036440 A1 | 2/2013 | Eyer | |
| 2013/0047180 A1* | 2/2013 | Moon | H04N 21/4627 725/30 |
| 2013/0055313 A1 | 2/2013 | Eyer | |
| 2013/0071090 A1* | 3/2013 | Berkowitz | H04N 9/7921 386/248 |
| 2013/0103716 A1 | 4/2013 | Yamagishi | |
| 2013/0145414 A1 | 6/2013 | Yamagishi | |
| 2013/0191860 A1 | 7/2013 | Kitazato et al. | |
| 2013/0201399 A1 | 8/2013 | Kitazato et al. | |
| 2013/0205327 A1 | 8/2013 | Eyer | |
| 2013/0212634 A1 | 8/2013 | Kitazato | |
| 2013/0254824 A1 | 9/2013 | Eyer | |
| 2013/0282870 A1 | 10/2013 | Dewa et al. | |
| 2013/0283311 A1 | 10/2013 | Eyer | |
| 2013/0283328 A1 | 10/2013 | Kitazato | |
| 2013/0291022 A1 | 10/2013 | Eyer | |
| 2013/0340007 A1 | 12/2013 | Eyer | |
| 2014/0013347 A1 | 1/2014 | Yamagishi | |
| 2014/0013379 A1 | 1/2014 | Kitazato et al. | |
| 2014/0020038 A1 | 1/2014 | Dewa | |
| 2014/0020042 A1 | 1/2014 | Eyer | |
| 2014/0040965 A1 | 2/2014 | Kitazato et al. | |
| 2014/0040968 A1 | 2/2014 | Kitazato et al. | |
| 2014/0043540 A1 | 2/2014 | Kitazato et al. | |
| 2014/0053174 A1 | 2/2014 | Eyer et al. | |
| 2014/0067922 A1 | 3/2014 | Yamagishi et al. | |
| 2014/0099078 A1 | 4/2014 | Kitahara et al. | |
| 2014/0122528 A1 | 5/2014 | Yamagishi | |
| 2014/0137153 A1 | 5/2014 | Fay et al. | |
| 2014/0137165 A1 | 5/2014 | Yamagishi | |
| 2014/0150040 A1 | 5/2014 | Kitahara et al. | |
| 2014/0157304 A1 | 6/2014 | Fay et al. | |
| 2014/0186008 A1 | 7/2014 | Eyer | |
| 2014/0208375 A1 | 7/2014 | Fay et al. | |
| 2014/0208380 A1 | 7/2014 | Fay et al. | |
| 2014/0229580 A1 | 8/2014 | Yamagishi | |
| 2014/0229979 A1 | 8/2014 | Kitazato et al. | |
| 2014/0253683 A1 | 9/2014 | Eyer et al. | |
| 2014/0327825 A1 | 11/2014 | Eyer | |
| 2014/0348448 A1 | 11/2014 | Eyer | |
| 2014/0351877 A1 | 11/2014 | Eyer | |
| 2014/0354890 A1 | 12/2014 | Eyer | |
| 2015/0007215 A1 | 1/2015 | Fay et al. | |
| 2015/0007219 A1 | 1/2015 | Blanchard et al. | |
| 2015/0007242 A1 | 1/2015 | Fay | |
| 2015/0012588 A1 | 1/2015 | Yamagishi | |
| 2015/0012933 A1 | 1/2015 | Fay et al. | |
| 2015/0012955 A1 | 1/2015 | Kitazato | |
| 2015/0020146 A1 | 1/2015 | Eyer | |
| 2015/0026730 A1 | 1/2015 | Eyer | |
| 2015/0026739 A1 | 1/2015 | Kitazato | |
| 2015/0033280 A1 | 1/2015 | Fay | |
| 2015/0038100 A1 | 2/2015 | Fay | |
| 2015/0046937 A1 | 2/2015 | Kitazato et al. | |
| 2015/0046942 A1 | 2/2015 | Eyer | |
| 2015/0058410 A1 | 2/2015 | Yamagishi et al. | |
| 2015/0058875 A1 | 2/2015 | Kitahara et al. | |
| 2015/0058906 A1 | 2/2015 | Kitazato et al. | |
| 2015/0058911 A1 | 2/2015 | Kitazato et al. | |
| 2015/0062428 A1 | 3/2015 | Eyer | |

(56) References Cited

U.S. PATENT DOCUMENTS

2015/0067713 A1 3/2015 Yamagishi
2015/0074704 A1 3/2015 Kitazato

FOREIGN PATENT DOCUMENTS

| | | |
|---|---|---|
| JP | 2003-524199 | 8/2003 |
| JP | 2006-050237 | 2/2006 |
| JP | 2009532956 | 9/2009 |
| JP | 2010-268462 | 11/2010 |
| RU | 2 348 972 C2 | 6/2008 |
| RU | 2008 152 409 A | 7/2010 |
| WO | WO 2007/072327 A2 | 6/2007 |

OTHER PUBLICATIONS

U.S. Appl. No. 13/107,604, filed May 13, 2011, 2012-0072965, Dewa.
U.S. Appl. No. 13/238,080, filed Sep. 21, 2011, 2012-0082266, Kitazato, et al.
U.S. Appl. No. 13/212,972, filed Aug. 18, 2011, 2012-0050620, Kitazato.
U.S. Appl. No. 13/220,231, filed Aug. 29, 2011, 2012-0060197, Kitahara, et al.
U.S. Appl. No. 13/038,939, filed Mar. 2, 2011, 2011-0302599, Eyer.
U.S. Appl. No. 12/985,241, filed Jan. 5, 2011, 2011-0243536, Eyer.
U.S. Appl. No. 13/043,170, filed Mar. 8, 2011, 2012-0047531, Eyer.
U.S. Appl. No. 13/039,005, filed Mar. 2, 2011, 2011-0299827, Eyer.
U.S. Appl. No. 13/071,560, filed Mar. 25, 2011, 2012-0054268, Yamagishi.
U.S. Appl. No. 13/075,440, filed Mar. 30, 2011, 2012-0054214, Yamagishi, et al.
U.S. Appl. No. 13/046,579, filed Mar. 11, 2011, 2011-0247028, Eyer.
U.S. Appl. No. 13/206,627, filed Aug. 10, 2011, 2012-0084802, Kitazato.
U.S. Appl. No. 13/238,065, filed Sep. 21, 2011, 2012-0081607, Kitazato.
U.S. Appl. No. 12/942,835, filed Nov. 9, 2010, 2011-0246488, Eyer.
U.S. Appl. No. 13/009,720, filed Jan. 19, 2011, 2012-0185888, Eyer, et al.
U.S. Appl. No. 13/080,866, filed Apr. 6, 2011, 2012-0054235, Kitazato, et al.
U.S. Appl. No. 13/071,551, filed Mar. 25, 2011, 2012-0050619, Kitazato, et al.
U.S. Appl. No. 12/798,118, filed Mar. 30, 2010, 2011-0088075, Eyer.
U.S. Appl. No. 13/038,984, filed Mar. 2, 2011, 2011-0298981, Eyer.
U.S. Appl. No. 13/038,967, filed Mar. 2, 2011, 2011-0302611, Eyer.
U.S. Appl. No. 13/422,203, filed Mar. 16, 2012, 2012-0253826, Kitazato, et al.
U.S. Appl. No. 13/562,946, filed Jul. 31, 2012, 2013-0055313, Eyer.
U.S. Appl. No. 13/559,166, filed Jul. 26, 2012, 2013-0036440, Eyer.
U.S. Appl. No. 13/490,216, filed Jun. 6, 2012, 2013-0024894, Eyer.
U.S. Appl. No. 13/587,975, filed Aug. 17, 2012, 2013-0212634, Kitazato.
U.S. Appl. No. 13/648,753, filed Oct. 10, 2012, 2013-0103716, Yamagishi.
U.S. Appl. No. 13/679,624, filed Nov. 16, 2012, 2013-0145414, Yamagishi.
U.S. Appl. No. 13/741,863, filed Jan. 15, 2013, 2013-0191860, Kitazato et al.
U.S. Appl. No. 13/753,591, filed Jan. 30, 2013, 2013-0201399, Kitazato et al.
U.S. Appl. No. 13/777,429, filed Feb. 26, 2013, 2014-0043540, Kitazato et al.
U.S. Appl. No. 13/777,693, filed Feb. 26, 2013, 2014-0040965, Kitazato et al.
U.S. Appl. No. 13/777,734, filed Feb. 26, 2013, 2014-0013379, Kitazato et al.
U.S. Appl. No. 13/782,694, filed Mar. 1, 2013, 2013-0254824, Eyer.
U.S. Appl. No. 13/782,730, filed Mar. 1, 2013, 2013-0283311, Eyer.
U.S. Appl. No. 13/841,343, filed Mar. 15, 2013, 2013-0205327, Eyer.
U.S. Appl. No. 13/846,282, filed Mar. 18, 2013, 2013-0282870, Dewa et al.
U.S. Appl. No. 13/846,247, filed Mar. 18, 2013, 2014-0040968, Kitazato et al.
U.S. Appl. No. 13/888,865, filed May 7, 2013, 2014-0099078, Kitahara et al.
U.S. Appl. No. 13/894,779, filed May 15, 2013, 2014-0122528, Yamagishi.
U.S. Appl. No. 13/905,721, filed May 30, 2013, 2014-0150040, Kitahara et al.
U.S. Appl. No. 13/915,664, filed Jun. 12, 2013, 2013-0340007, Eyer.
U.S. Appl. No. 13/930,814, filed Jun. 28, 2013, 2015-0007242, Fay.
U.S. Appl. No. 13/930,880, filed Jun. 28, 2013, 2015-0007215, Fay et al.
U.S. Appl. No. 13/924,907, filed Jun. 24, 2013, 2013-0291022, Eyer.
U.S. Appl. No. 13/997,844, filed Jun. 25, 2013, 2013-0283328, Kitazato.
U.S. Appl. No. 13/927,667, filed Jun. 26, 2013, 2014-0229580, Yamagishi.
U.S. Appl. No. 13/934,581, filed Jul. 3, 2013, 2014-0020042, Eyer.
U.S. Appl. No. 13/934,549, filed Jul. 3, 2013, 2015-0012933, Fay et al.
U.S. Appl. No. 13/934,615, filed Jul. 3, 2013, 2014-0354890, Eyer.
U.S. Appl. No. 13/934,924, filed Jul. 3, 2013, 2014-0137165, Yamagishi.
U.S. Appl. No. 13/963,138, filed Aug. 9, 2013, 2014-0157304, Fay et al.
U.S. Appl. No. 13/963,111, filed Aug. 9, 2013, 2014-0137153, Fay et al.
U.S. Appl. No. 13/968,035, filed Aug. 15, 2013, 2014-0053174, Eyer et al.
U.S. Appl. No. 14/025,310, filed Sep. 12, 2013, 2014-0020038, Dewa.
U.S. Appl. No. 14/026,551, filed Sep. 13, 2013, 2014-0013347, Yamagishi.
U.S. Appl. No. 14/046,543, filed Oct. 4, 2013, 2014-0208380, Fay et al.
U.S. Appl. No. 14/046,566, filed Oct. 4, 2013, 2014-0208375, Fay et al.
U.S. Appl. No. 14/069,032, filed Oct. 31, 2013, 2014-0067922, Yamagishi et al.
U.S. Appl. No. 14/196,432, filed Mar. 4, 2014, 2014-0186008, Eyer.
U.S. Appl. No. 14/253,474, filed Apr. 15, 2014, 2014-0229979, Kitazato et al.
U.S. Appl. No. 14/275,231, filed May 12, 2014, 2014-0327825, Eyer.
U.S. Appl. No. 14/282,572, filed May 20, 2014, 2014-0253683, Eyer et al.
U.S. Appl. No. 14/295,695, filed Jun. 4, 2014, Eyer.
U.S. Appl. No. 14/457,290, filed Aug. 12, 2014, 2014-0348488, Eyer.
U.S. Appl. No. 14/458,310, filed Aug. 13, 2014, 2014-0351877, Eyer.
U.S. Appl. No. 14/490,263, filed Sep. 18, 2014, 2015-0007219, Blanchard et al.
U.S. Appl. No. 14/493,661, filed Sep. 23, 2014, 2015-0012588, Yamagishi.
U.S. Appl. No. 14/493,721, filed Sep. 23, 2014, 2015-0012955, Kitazato.
U.S. Appl. No. 14/504,455, filed Oct. 2, 2014, 2015-0038100, Fay.
U.S. Appl. No. 14/504,984, filed Oct. 2, 2014, 2015-0020146, Eyer.
U.S. Appl. No. 14/509,200, filed Oct. 8, 2014, 2015-0026730, Eyer.
U.S. Appl. No. 14/509,166, filed Oct. 8, 2014, 2015-0026739, Kitazato.
U.S. Appl. No. 14/512,761, filed Oct. 13, 2014, 2015-0033280, Fay.
U.S. Appl. No. 14/512,776, filed Oct. 13, 2014, Kitazato.

(56) References Cited

OTHER PUBLICATIONS

U.S. Appl. No. 14/521,034, filed Oct. 22, 2014, 2015-0046942, Eyer.
U.S. Appl. No. 14/529,440, filed Oct. 31, 2014, 2015-0058906, Kitazato et al.
U.S. Appl. No. 14/529,490, filed Oct. 31, 2014, 2015-0058410, Yamagishi et al.
U.S. Appl. No. 14/529,450, filed Oct. 31, 2014, 2015-0046937, Kitazato et al.
U.S. Appl. No. 14/529,421, filed Oct. 31, 2014, 2015-0058911, Kitazato et al.
U.S. Appl. No. 14/529,461, filed Oct. 31, 2014, 2015-0058875, Kitahara et al.
U.S. Appl. No. 14/538,311, filed Nov. 11, 2014, 2015-0062428, Eyer.
U.S. Appl. No. 14/538,083, filed Nov. 11, 2014, 2015-0067713, Yamagishi.
U.S. Appl. No. 14/543,231, filed Nov. 17, 2014, 2015-0074704, Kitazato.
U.S. Appl. No. 14/551,299, filed Nov. 24, 2014, Kitazato.
U.S. Appl. No. 14/566,574, filed Dec. 10, 2014, Fay.
U.S. Appl. No. 14/584,875, filed Dec. 29, 2014, Eyer.
U.S. Appl. No. 14/626,216, filed Feb. 19, 2015, Kitazato.
International Search Report dated Mar. 21, 2013 in PCT/JP2012/007506.
Office Action dated Jun. 15, 2016 in Chinese Patent Application No. 201280057322.9 (with English translation).
Office Action dated Oct. 11, 2016 in Japanese Patent Application No. 2014-518464.

* cited by examiner

FIG.10A http://xxxx.com/applocation?clientLocalTime=aaa&contentID=bbb&contentTime=ccc&startTime=ddd

←——— QUERY CHARACTER STRING ———→

FIG.10B http://xxxx.com/applocation?clientLocalTime=aaa&contentID=bbb&contentTime

←——— QUERY CHARACTER STRING ———→

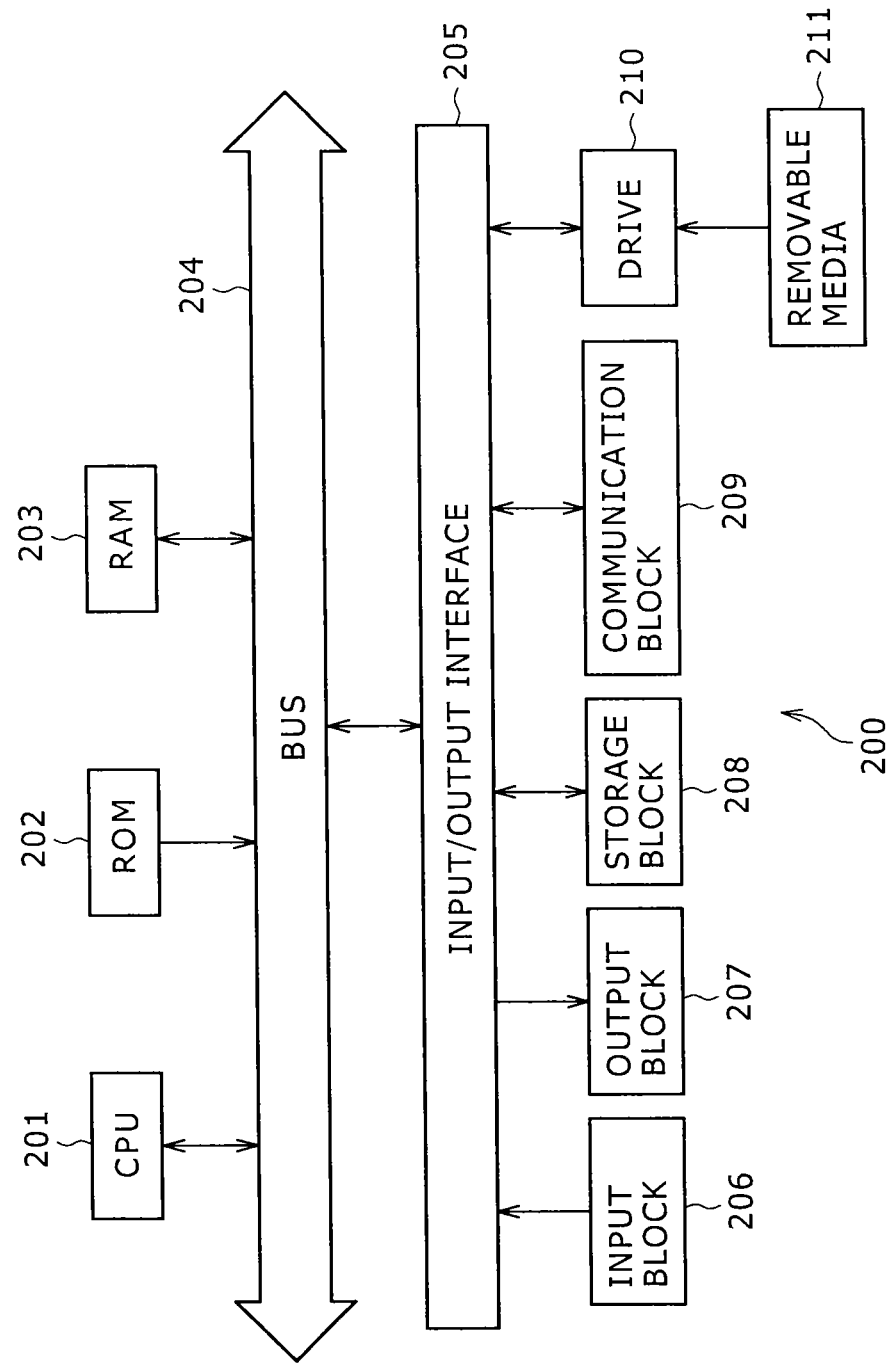

TERMINAL APPARATUS, SERVER APPARATUS, INFORMATION PROCESSING METHOD, PROGRAM, AND LINKING APPLICATION SUPPLY SYSTEM

CROSS-REFERENCE TO RELATED APPLICATIONS

This application is a continuation of U.S. Ser. No. 13/679,624 filed Nov. 16, 2012, which is a non-provisional of U.S. Ser. No. 61/564,622 filed Nov. 29, 2011. The entire content of the applications are incorporated herein by reference.

TECHNICAL FIELD

The present disclosure relates to a terminal apparatus, a server apparatus, an information processing method, a program, and a linking application supply system and, more particularly, to a terminal apparatus, a server apparatus, an information processing method, a program, and a linking application supply system that are configured to execute application programs in operative association with the progress of not only television programs but also given content being viewed.

BACKGROUND ART

Take for example, the displaying, for TV (television) viewers, of information (cast, outline, preview of next installment, and the like) of a television program (here sometimes referred to simply as a program) being viewed and information (news, weather forecast, traffic information and the like) beneficial to viewers though not directly associated with a program itself onto the screen.

In order to realize the above-mentioned function, commands for obtaining and launching a dedicated application program (hereafter sometimes referred to simply as an application program) may be transmitted beforehand to the TV receiver in link with the progress of the program. Actually, this function has already been realized in Japan and Europe, for example, by transmitting these commands and applications by use of a band for data broadcasting in a TV broadcast signal (refer to Patent Document 1 below for example).

On the other hand, in the U.S.A., the band for data broadcasting is not arranged in the TV broadcast signal and no alternative method has been established, so that the execution of an application in link with the progress of a program has not been realized.

It should be noted that, in the U.S.A., more families view programs via CATV and IPTV than those directly receiving and viewing programs through TV receivers. With CATV and IPTV, only video and audio may be extracted for delivery from TV broadcasting, so that, even if the band for data broadcasting is arranged in the TV broadcast signal in the U.S.A., the transmission of the data broadcast signal containing application-associated data up to viewers cannot be assured.

PRIOR ART DOCUMENT

Patent Document

[Patent Document 1]
Japanese Patent Laid-open NO. 2006-50237

SUMMARY OF THE INVENTION

Problems to be Solved by the Invention

Further, recently, in the case where given content, such as recorded programs and programs reproduced from package media based on DVD and BD is viewed, there is a demand for executing applications in link with the progress of the content. However, this demand has not been satisfied.

Therefore, the present disclosure addresses the above-identified and other problems and solves the addressed problems by providing technologies for executing applications in link with the progress of content being viewed at user homes.

Means for Solving the Problems

In carrying out the invention and according to a first aspect thereof, there is provided a terminal apparatus. This terminal apparatus has an extracting block configured to extract signature data indicative of a feature of content from the content to be reproduced; a query generating block configured to generate a query that at least includes the extracted signature data; a communication block configured to transmit the generated query to a server apparatus and receive a response returned by the server apparatus in response to the query; and an application executing block configured to obtain an application on the basis of an application URL (Uniform Resource Locator) in which at least application identification information is written, the application URL being included in the response, and execute the application.

In the above-mentioned terminal apparatus, execution time information indicative of an execution time of the application is further written to the application URL and the application executing block obtains the application with a timing which it is ready in time for the execution time.

In the abovementioned terminal apparatus, at least one of extraction local time information indicative of a time at which the signature data was extracted by the extracting block, content identification information indicative of the corresponding content, and extraction reproduction time information indicative of an extraction time at a content reproduction timing of the corresponding signature data is further written to the application URL.

In the above-mentioned terminal apparatus, the terminal apparatus is incorporated in a reproducing apparatus configured to reproduce content. The above-mentioned terminal apparatus further has a content supply block configured to supply all pieces of content to be reproduced by the reproducing apparatus to the extracting block.

In carrying out the invention and according to the first aspect of the invention, there is provided an information processing method for a terminal apparatus. The above-mentioned information processing method has the steps of extracting signature data indicative of a feature of content from the content to be reproduced; generating a query that at least includes the extracted signature data; transmitting the generated query to a server apparatus and receiving a response returned by the server apparatus in response to the query; and obtaining an application on the basis of an application URL (Uniform Resource Locator) in which at least application identification information is written, the application URL being included in the response, and executing the application.

In carrying out the invention and according the first aspect thereof, there is provided a program for making a computer function as: an extracting block configured to extract signature data indicative of a feature of content from the content to be reproduced; a query generating block configured to generate a query that at least includes the extracted signature data; a communication block configured to transmit the generated query to a server apparatus and receive a response returned by the server apparatus in response to the query; and an application executing block configured to obtain an application on the basis of an application URL (Uniform Resource Locator) in which at least application identification information is written, the application URL being included in the response, and execute the application.

In the first aspect of the present disclosure, signature data indicative of the feature of content is extracted from the content to be reproduced, a query at least including the extracted signature data is generated, the generated query is transmitted to a server apparatus, a response returned by the server apparatus in response to the query is received, and an application is obtained on the basis of an application URL in which at least application identification information is written, this application URL being included in the received response.

In carrying out the invention and according a second aspect thereof, there is provided a server apparatus. This server apparatus has a database configured to indicate a relation between signature data indicative of a feature of content extracted therefrom, content identification information indicative of the content of extraction source, and application identification information indicative of an application to be executed in link with the content; a response generating block configured to identify content from which signature data included in a query transmitted from a terminal apparatus was extracted by referencing the database and generate a response at least including an application URL (Uniform Resource Locator) in which the application identification information indicative of an application to be executed in link with the identified content is written; a transmitting block configured to transmit the generated response to the terminal apparatus; and an application supply block configured to supply the application to the terminal apparatus in response to a request from the terminal apparatus on the basis of the application URL included in the response.

In the above-mentioned server apparatus, the application supply block regenerates the application and supply the regenerated application to the terminal apparatus in response to a request from the terminal apparatus on the basis of the application URL included in the response.

In the above-mentioned server apparatus, the application supply block adjusts at least one of an execution timing of the application and an event fire timing in the application being executed as regeneration of the application.

In the above-mentioned server apparatus, at least one of extraction local time information indicative of a time at which the corresponding signature data was extracted in the terminal apparatus, content identification information indicative of the corresponding content, and extraction reproduction time information indicative of an extraction timing in a content reproduction timing of the corresponding signature data is further written to the application URL.

In carrying out the invention and according to the second aspect thereof, there is provided an information processing method for a server apparatus. This information processing method has the steps of: identifying content from which signature data included in a query transmitted from a terminal apparatus was extracted by referencing a database configured to indicate a relation between signature data indicative of a feature of content extracted therefrom, content identification information indicative of the content of extraction source, and application identification information indicative of an application to be executed in link with the content and generating a response at least including an application URL (Uniform Resource Locator) in which the application identification information indicative of an application to be executed in link with the identified content is written; transmitting the generated response to the terminal apparatus; and supplying the application to the terminal apparatus in response to a request from the terminal apparatus on the basis of the application URL included in the response.

In carrying out the invention and according to the second aspect thereof, there is provided a program for making a computer function as: a database configured to indicate a relation between signature data indicative of a feature of content extracted therefrom, content identification information indicative of the content of extraction source, and application identification information indicative of an application to be executed in link with the content; a response generating block configured to identify content from which signature data included in a query transmitted from a terminal apparatus was extracted by referencing the database and generate a response at least including an application URL (Uniform Resource Locator) in which the application identification information indicative of an application to be executed in link with the identified content is written; a transmitting block configured to transmit the generated response to the terminal apparatus; and an application supply block configured to supply the application to the terminal apparatus in response to a request from the terminal apparatus on the basis of the application URL included in the response.

In the second aspect of the present disclosure, content from which signature data included in a query returned from a terminal apparatus is identified by a database indicative of a relation between signature data indicative of a feature of content extracted therefrom, content identification information indicative of the content of extraction source, and application identification information indicative of an application to be executed in link with the content, a response at least including an application URL (Uniform Resource Locator) in which the application identification information indicative of the application to be executed in link with the identified content is generated, the generated response is transmitted to the terminal apparatus, and the above-mentioned application is supplied to the above-mentioned terminal apparatus in response to a request from the above-mentioned terminal apparatus on the basis of the application URL included in the above-mentioned response.

In carrying out the invention and according to a third aspect thereof, there is provided a linking application supply system. This linking application supply system has a terminal apparatus and a server apparatus. The terminal apparatus has an extracting block configured to extract signature data indicative of a feature of content from the content to be reproduced; a query generating block configured to generate a query that at least includes the extracted signature data; a communication block configured to transmit the generated query to a server apparatus and receive a response returned by the server apparatus in response to the query; and an application executing block configured to obtain an application on the basis of an application URL (Uniform Resource Locator) in which at least application identification information is written, the application URL being included in the response, and execute the application. The server apparatus has a database configured to indicate a relation between signature data indicative of a feature of content extracted therefrom, content identification information indicative of the content of extraction source, and application identification information indicative of an application to be executed in link with the content; a response generating block configured to identify content from which signature data included in a query transmitted from a terminal apparatus was extracted by referencing the database and generate a response at least including an application URL (Uniform Resource Locator) in which the application identification information indicative of an application to be executed in link with the identified content is written; a transmitting block configured to transmit the generated response to the terminal apparatus; and an application supply block configured to supply the application to the terminal apparatus in response to a request from the terminal apparatus on the basis of the application URL included in the response.

In the third aspect of the present disclosure, signature data indicative of a feature of content is extracted by the terminal apparatus from the content to be reproduced, a query at least including the extracted signature data is generated, the generated query is transmitted to the server apparatus, a response returned by the server apparatus in response to the request is received, and an application is obtained to be executed on the basis of the application URL in which at least application identification information is written, the application URL being included in the received response. At the same time, when the database indicative of a relation between signature data indicative of a feature of content extracted therefrom, content identification information indicative of the content of extraction source, and application identification information indicative of an application to be executed in link with the content is referenced by the server apparatus, the content from which the signature data included in the query transmitted from the terminal apparatus is identified, a response at least including the application URL (Uniform Resource Locator) in which the application identification information indicative of the application to be executed in link with the identified content is generated, the generated response is transmitted to the terminal apparatus, and the application is supplied to the terminal apparatus in response to a request from the terminal apparatus on the basis of the application URL included in the response.

Effect of the Invention

According to the first aspect of the present disclosure, an application can be executed in link with the content being viewed at user's home.

According to the second aspect of the present disclosure, an application can be executed in link with the content being viewed at user's home.

According to the third aspect of the present disclosure, an application can be executed in link with the content being viewed at user's home.

BRIEF DESCRIPTION OF THE DRAWINGS

FIG. 8 is a diagram illustrating a relation between content and signature data and so on.

FIGS. 10A-10B are diagrams illustrating an exemplary description of an application URL.

FIG. 15 is a block diagram illustrating an exemplary configuration of a computer.

MODE FOR CARRYING OUT THE INVENTION

This invention will be described in further detail by way of best modes (hereafter referred to embodiments) thereof with reference to the accompanying drawings.

[Exemplary Configuration of a Linking Application Supply System]

Figure 1:
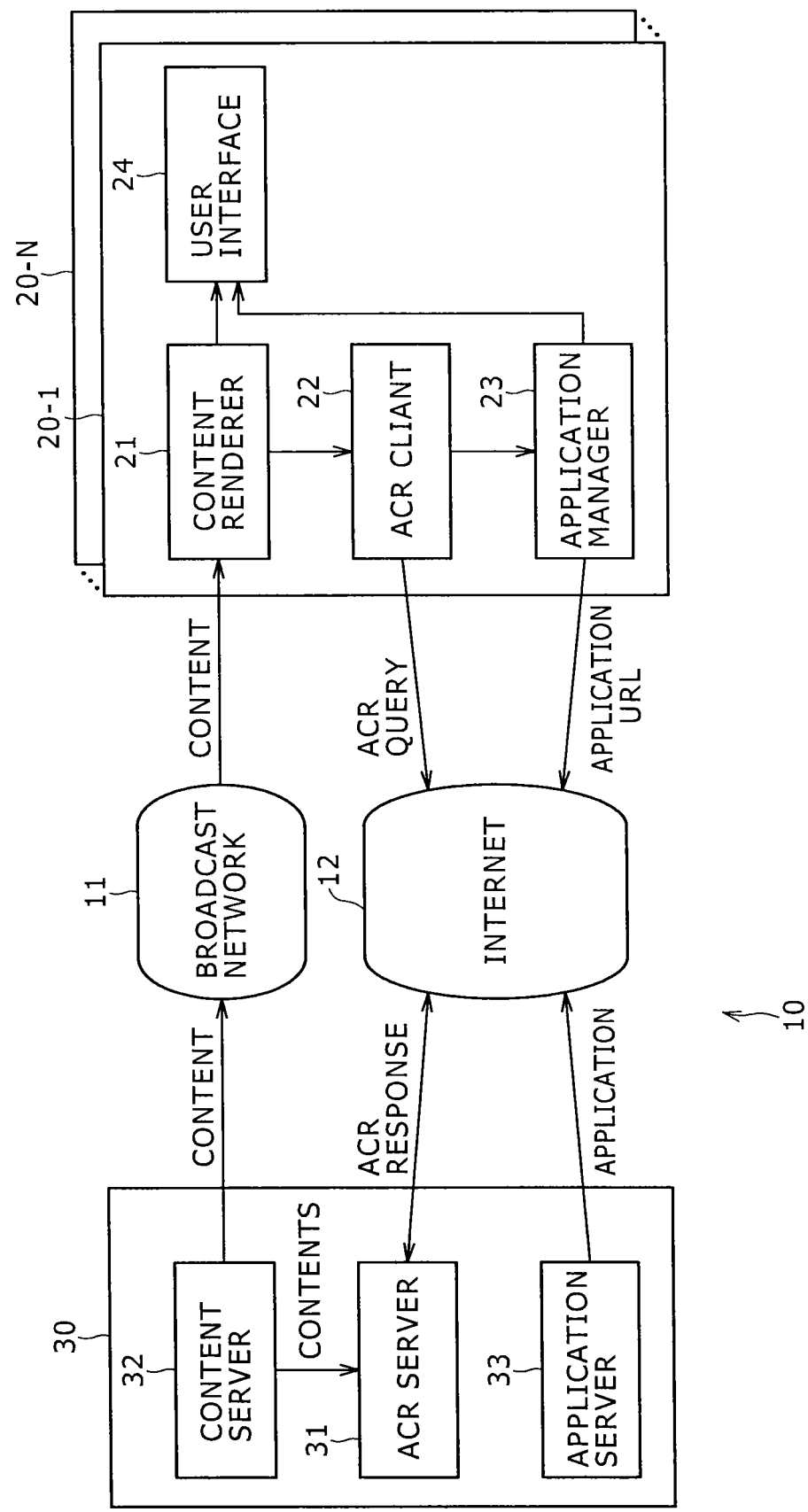
FIG. 1 is a block diagram illustrating an exemplary configuration of a linking application supply system practiced as one embodiment of the invention.

Now, referring to FIG. 1, there is shown an exemplary configuration of a linking application supply system practiced as one embodiment of the invention.

This linking application supply system 10 is configured to execute an application in link with the progress of content being viewed by a user through TV receiver or the like.

Executing the application allows information (cast, outline, preview of next installment, and the like) associated with the content being viewed and user beneficial information (news, weather forecast, traffic information and the like) not directly associated with content to be displayed on the screen or the realization of viewer participating quiz and voting, for example.

It should be noted that content as used herein is not limited to on-air programs received by the TV receiver via a TV broadcasting network, a CATV network, or an IPTV network. For example, the content as used herein includes a program reproduced from the recording by a video recorder, a video reproduced from a package media by a multimedia player, a video distributed by a personal computer via the Internet, and so on, for example.

The linking application supply system 10 is configured by two or more terminal apparatuses 20-1 through 20-N and a supply apparatus 30. In the following, the terminal apparatuses 20-1 through 20-N are generically referred to simply as the terminal apparatus 20 unless otherwise noted. It is assumed that the terminal apparatus 20 be arranged at a user home for example in a state of being incorporated in a content reproduction apparatus typified by a TV receiver, for example.

[Description of the Terminal Apparatus 20]

The terminal apparatus 20 is connected to the supply apparatus 30 via a broadcasting network 11 including a TV broadcasting network, a CATV network, and an IPTV network and the Internet 12.

The terminal apparatus 20 has a content renderer 21, an ACR client 22, an application manager 23, and a user interface 24.

The content renderer 21 has a function of obtaining content from the outside and reproducing the obtained content. In addition, the content renderer 21 branches all items of content displayed on a display device such as a TV receiver in which the terminal apparatus 20 is incorporated and supplies the branched pieces of content to the ACR client 22. Namely, the content renderer 21 branches not only a program received by the tuner of the TV receiver in which the terminal apparatus 20 is incorporated but also the content entered via various input terminals (such as ah HDMI terminal and so on) of the TV receiver and supplies the branched pieces of content to the ACR client 22.

The ACR client 22 extracts signature data indicative of a feature of the content concerned in a predetermined sample period from the content entered from the content renderer 21. For a method of signature data extraction, any of existing methods can be applied. For example, a watermark embedded in content in advance may be extracted to provide signature data or a finger print may be computed to provide signature data.

Use of a finger print as signature data provides the same signature data as that before rendering even if content resolution, aspect ratio, bit rate, and coded format have been rendered. Therefore, the accuracy of identification in the case where content identification is executed on the basis of this signature data can be increased.

The ACR client 22 generates an ACR query that includes the extracted signature data and transmits the generated ACR query to an ACR server 31 of the supply apparatus 30 via the Internet 12. In addition, the ACR client 22 receives and holds an ACR response returned by the ACR server 31 in accordance with the transmitted ACR query. Further, the ACR client 22 analyzes the held ACR response to make the application manager 23 execute an application corresponding to the content being viewed, in link with the progress of the content.

Under the control of the ACR client 22, the application manager 23 obtains the application corresponding to the content being viewed from an application server 33 via the Internet 12 and executes the obtained application. In addition, the application manager 23 obtains associated meta data for use by the application being executed from the application server 33.

The user interface 24 displays, on a display device such as a TV receiver, various kinds of information to be displayed by the application executed in link with the progression of the content. In addition, the user interface 24 receives a user operation done on the application being executed.

[Description of the Supply Apparatus 30]

The supply apparatus 30 is configured by the ACR server 31, a content server 32, and the application server 33.

The ACR server 31 generates beforehand ACR reference data obtained by relating content identifier and application identifier with the signature data extracted in a predetermined sampling period of various items of content to be viewed on the terminal apparatus 20 and holds the generated ACR reference data. In addition, in response to an ACR query transmitted from the ACR client 22 of the terminal apparatus 20, the ACR server 31 generates an ACR response and transmits the generated ACR response to the ACR client 22 via the Internet 12.

The content server 32 distributes content via the broadcasting network 11 and, at the same time, supplies the content to be distributed to the ACR server 31.

The application server 33 supplies applications and associated meta data in response to a request from the application manager 23 of the terminal apparatus 20.

It should be noted that the ACR server 31, the content server 32, and the application server 33 that configure the supply apparatus 30 may be arranged at one location in a concentrated manner or at different places in a dispersed manner. Also, the ACR server 31, the content server 32, and the application server 33 may be configured in appropriate combinations.

[Detail Exemplary Configuration of the ACR Client 22]

Figure 2:
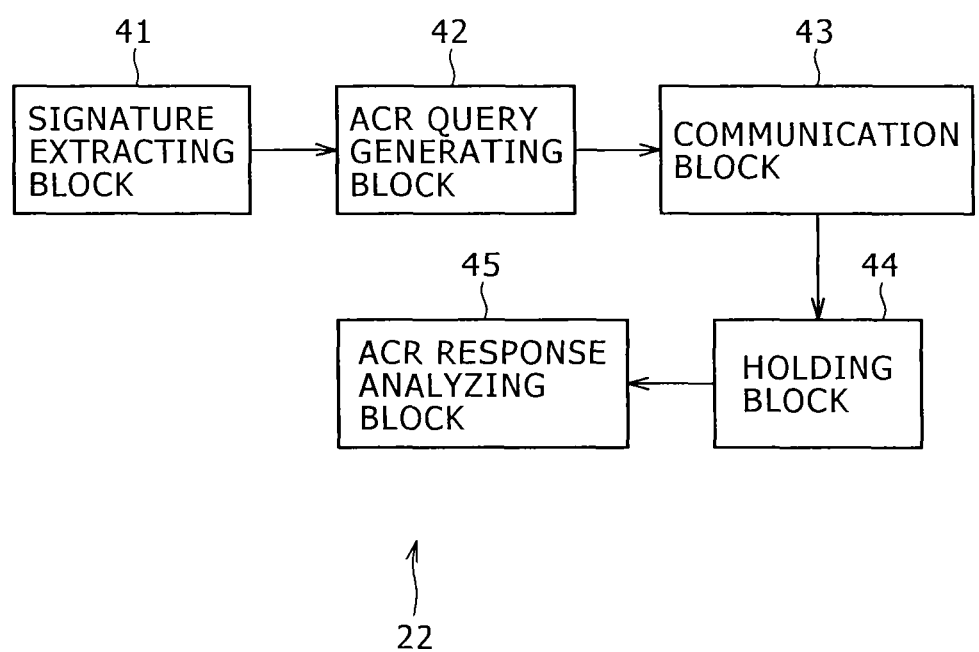
FIG. 2 is a block diagram illustrating an exemplary configuration of an ACR (Automatic Content Recognition) client.

Referring to FIG. 2, there is shown a detail exemplary configuration of the ACR client 22 of the terminal apparatus 20.

The ACR client 22 is configured by a signature extracting block 41, an ACR query generating block 42, a communication block 43, a holding block 44, and an ACR response analyzing block 45.

The signature extracting block 41 extracts, by use of a predetermined extraction method, signature data indicative of a feature of content in a predetermined sampling period from the content entered from the content renderer 21 and outputs the extracted signature data to the ACR query generating block 42. It should be noted that signature data extraction timing and sample period may be set by the user as required.

The ACR query generating block 42 generates an ACR query including signature data every time the signature data is entered from the signature extracting block 41. A data structure of an ACR query will be described later with reference to FIG. 5.

The communication block 43 transmits the ACR query generated by the ACR query generating block 42 to the ACR server 31 of the supply apparatus 30 via the Internet 12. In addition, the communication block 43 receives an ACR response returned from the ACR server 31 and outputs the received ACR response to the holding block 44. The holding block 44 holds the ACR response received by the communication block 43.

The ACR response analyzing block 45 analyzes the ACR response held in the holding block 44 and identifies an application to be executed in link with the progress of the content being viewed, thereby notifying the application manager 23 thereof. To be more specific, an application included in the ACR response is notified.

[Detail Exemplary Configuration of the ACR Server 31]

Figure 3:
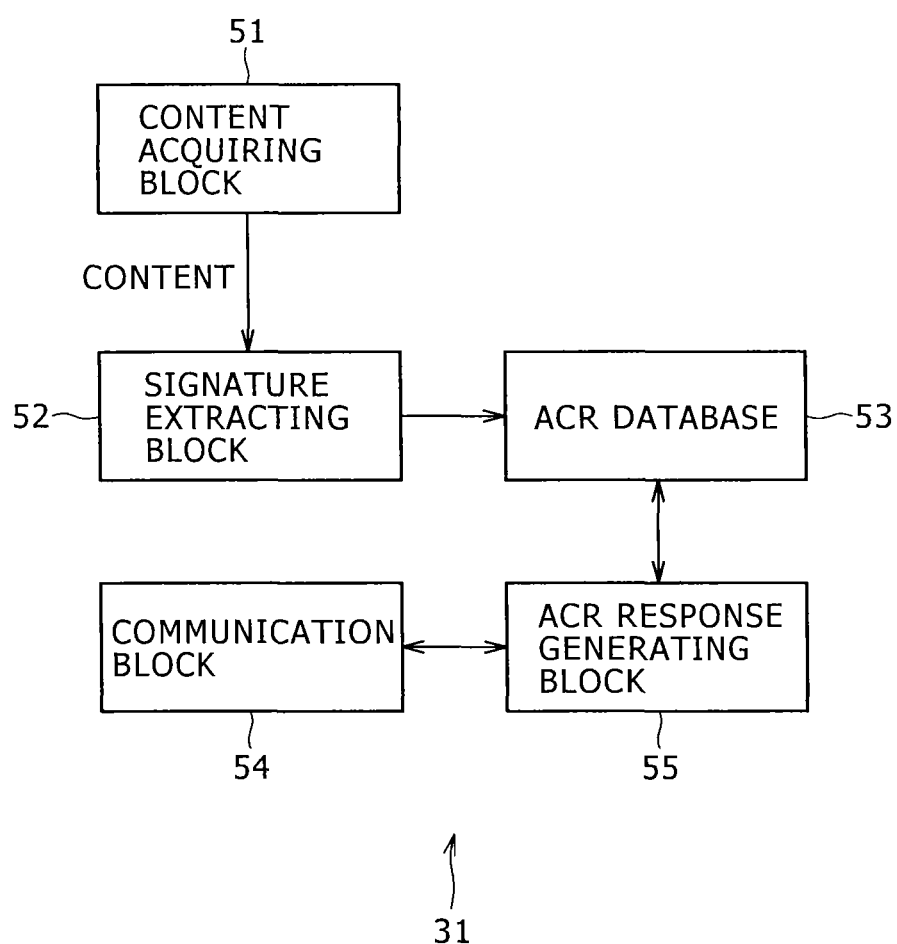
FIG. 3 is a block diagram illustrating an exemplary configuration of an ACR server.

Referring to FIG. 3, there is shown a detail exemplary configuration of the ACR server 31 that configures the supply apparatus 30.

The ACR server 31 is configured by a content acquiring block 51, a signature extracting block 52, an ACR database 53, a communication block 54, and an ACR response generating block 55.

The content acquiring block 51 obtains various kinds of content to be viewed at the terminal apparatus 20 and meta data of these various kinds of content from the content server 32 for example and supplies the obtained content to the signature extracting block 52.

Like the signature extracting block 41 of the ACR client 22, the signature extracting block 52 extracts the signature data indicative of a feature of the content from the content acquiring block 51 in a predetermined sampling period by use of a predetermined method and outputs the extracted signature data to the ACR database 53.

The ACR database 53 generates ACR reference data by relating a content identifier indicative of the content that is the extraction source of each item of signature data entered from the signature extracting block 52, a content reproduction time indicative of a signature data extraction timing, and an application identifier indicative of an application to be executed in a linked manner with above-mentioned each item of signature data entered from the signature extracting block 52 and holds the generated ACR reference data. It should be noted that ACR reference data generated in advance may be supplied to the ACR database 53 and held therein. A data structure of ACR reference data will be described later with reference to FIG. 6.

The communication block 54 receives an ACR query transmitted from the ACR client 22 of the terminal apparatus 20 via the Internet 12 and outputs the received query to the ACR response generating block 55. In addition, the communication block 54 transmits an ACR response generated by the ACR response generating block 55 to the ACR client 22 of the terminal apparatus 20 via the Internet 12.

The ACR response generating block 55 references the ACR reference data of the ACR database 53 to identify the content that was the extraction source of the signature data included in the ACR query transmitted from the ACR client 22 of the terminal apparatus 20 and, at the same time, identifies an application to be executed in link with the progress of the identified content. In addition, the ACR response generating block 55 generates the content identifier as a result of the identification and an ACR response including an application URL for example for the terminal apparatus 20 to obtain the identified application and outputs the generated information to the communication block 54. A data structure of the ACR response will be described later with reference to FIGS. 9A-9B.

It should be noted that, when the ACR response generating block 55 generates an ACR response, a communication delay of an ACR response in the Internet 12 is estimated on the basis an extraction local time stamp 75 (FIG. 5) included in the ACR query and a processing time of the ACR response generating block 55 itself is considered to select associated meta data to be stored in the ACR response.

[Exemplary Detail Configuration of the Application Server 33]

Figure 4:
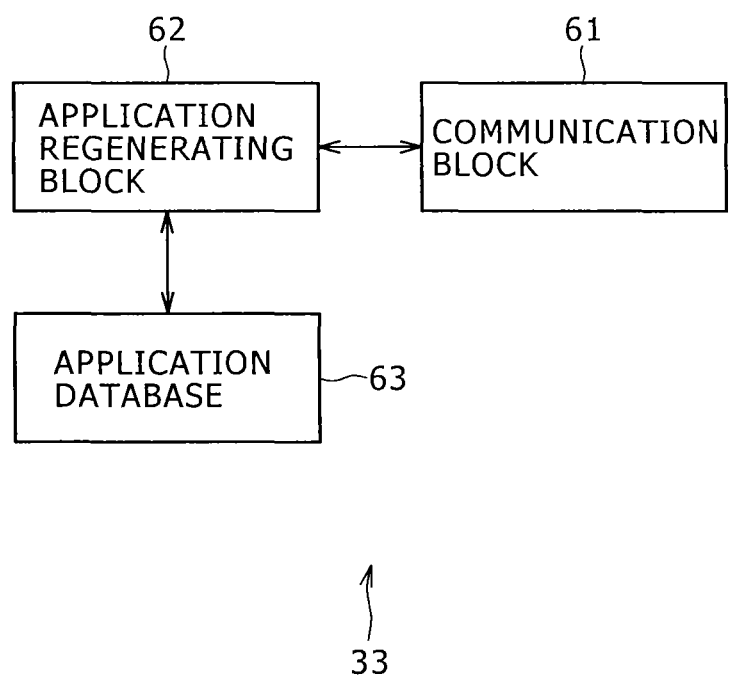
FIG. 4 is a block diagram illustrating an exemplary configuration of an application server.

Referring to FIG. 4, there is shown an exemplary detail configuration of the application server 33 configuring the supply apparatus 30.

The application server 33 is configured by a communication block 61, an application regenerating block 62, and an application database 63.

The communication block 61 communicates with the application manager 23 of the terminal apparatus 20 via the Internet 12 to supply an application from the application manager 23 as required. In response to the request (to be more specific, the notification of an application URL, details thereof to be described later) from the application manager 23 received by the communication block 61, the application regenerating block 62 appropriately regenerates the application held in the application database 63 and outputs the regenerated application to the communication block 61.

The application database 63 stores application schedule data including a content identifier indicative of content, a reproduction time indicative of timing of the progression of the content, and an application (program data thereof) to be executed in link with the reproduction time. A data structure of the application schedule data will be described later with reference to FIG. 7.

[Data Structure of an ACR Query]

Figure 5:
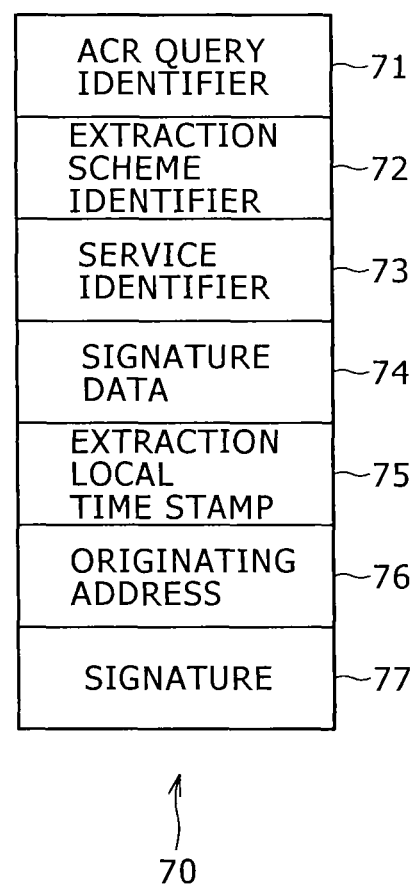
FIG. 5 is a diagram illustrating a data structure of an ACR query.

Referring to FIG. 5, there is shown a data structure of an ACR query generated in the ACR query generating block 42 of the ACR client 22.

An ACR query 70 includes an ACR query identifier 71, an extraction method identifier 72, a service identifier 73, a signature data 74, an extraction local time stamp 75, an originating address 76, and a signature 77.

The ACR query identifier 71 is information for identifying the ACR query 70 concerned. The extraction method identifier 72 is information for identifying an extraction method used to extract signature data 74. The service identifier 73 is information for selecting a service for processing the ACR query 70 concerned when there are two or more services for identifying content on the basis of the signature data 74.

The signature data 74 is extracted from the content by the signature extracting block 41. The extraction local time stamp 75 is indicative of a timing with which the signature data 74 is extracted from the content by the signature extracting block 41. This time stamp is indicated by a time indicated by a local system clock of the terminal apparatus 20.

The originating address 76 is an address in the Internet 12 of the terminal apparatus 20 that originates the ACR query 70 concerned and is used as information indicative of a return destination of an ACR response generated by the ACR server 31 in response to the ACR query 70 concerned. The signature 77 prevents the tampering of the ACR query 70 concerned along a communication route such as the Internet 12. It should be noted this tampering may also be prevented by encrypting the entire ACR query 70 concerned and transmitting the encrypted ACR query 70 concerned.

[Data Structure of ACR Reference Data]

Figure 6:
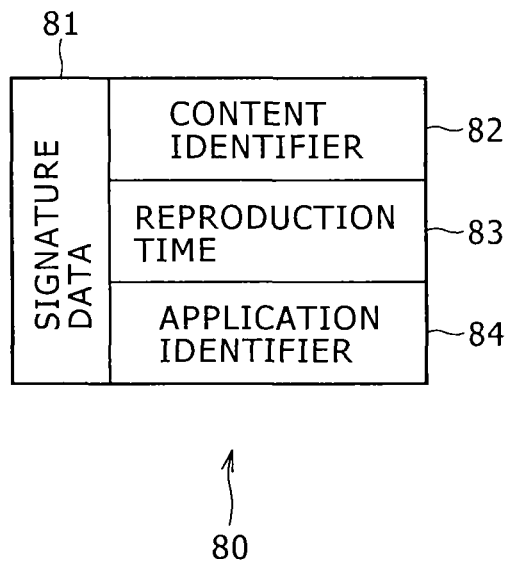
FIG. 6 is a diagram illustrating a data structure of ACR reference data.

Referring to FIG. 6, there is shown a data structure of ACR reference data that is held in the ACR database 53 of the ACR server 31.

In an ACR reference data 80, a content identifier 82 a reproduction time 83, and an application identifier 84 are related with a signature data 81.

The signature data 81 is extracted from content by the signature extracting block 52. The content identifier 82 is indicative of content from which the signature data 81 concerned has been extracted. The reproduction time 83 is indicative of the progression timing of content when the signature data 81 concerned has been extracted from the content indicated by the content identifier 82. For example, the reproduction time 83 is indicated by an elapsed time from the head of the content indicated by the content identifier 82.

The application identifier 84 is indicative of an application to be executed in link with the progression timing indicated by the reproduction time 83 of the content indicated by the content identifier 82.

[Data Structure of Application Schedule Data]

Figure 7:
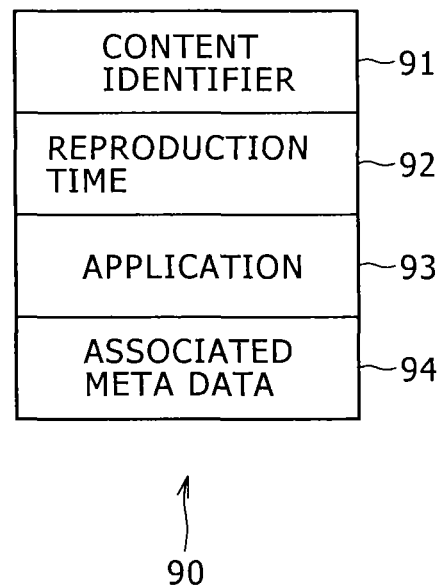
FIG. 7 is a diagram illustrating a data structure of application schedule data.

Referring to FIG. 7, there is shown a data structure of application schedule data held in the application database 63 of the application server 33.

Application schedule data 90 includes a content identifier 91, a reproduction time 92, an application 93, and associated meta data 94.

The content identifier 91 is indicative of a particular piece of content. The reproduction time 92 is indicative of the progression timing of the content indicated by the content identifier 91 and is indicated by an elapsed time from the head of the content for example. The application 93 is an application (program data thereof) to be executed in link with the progression timing indicated by the reproduction time 92 of the content indicated by the content identifier 91. The associated meta data 94 includes various kinds of information (data to be displayed and so on) that are used by the application 93 being executed in the terminal apparatus 20.

Figure 8:
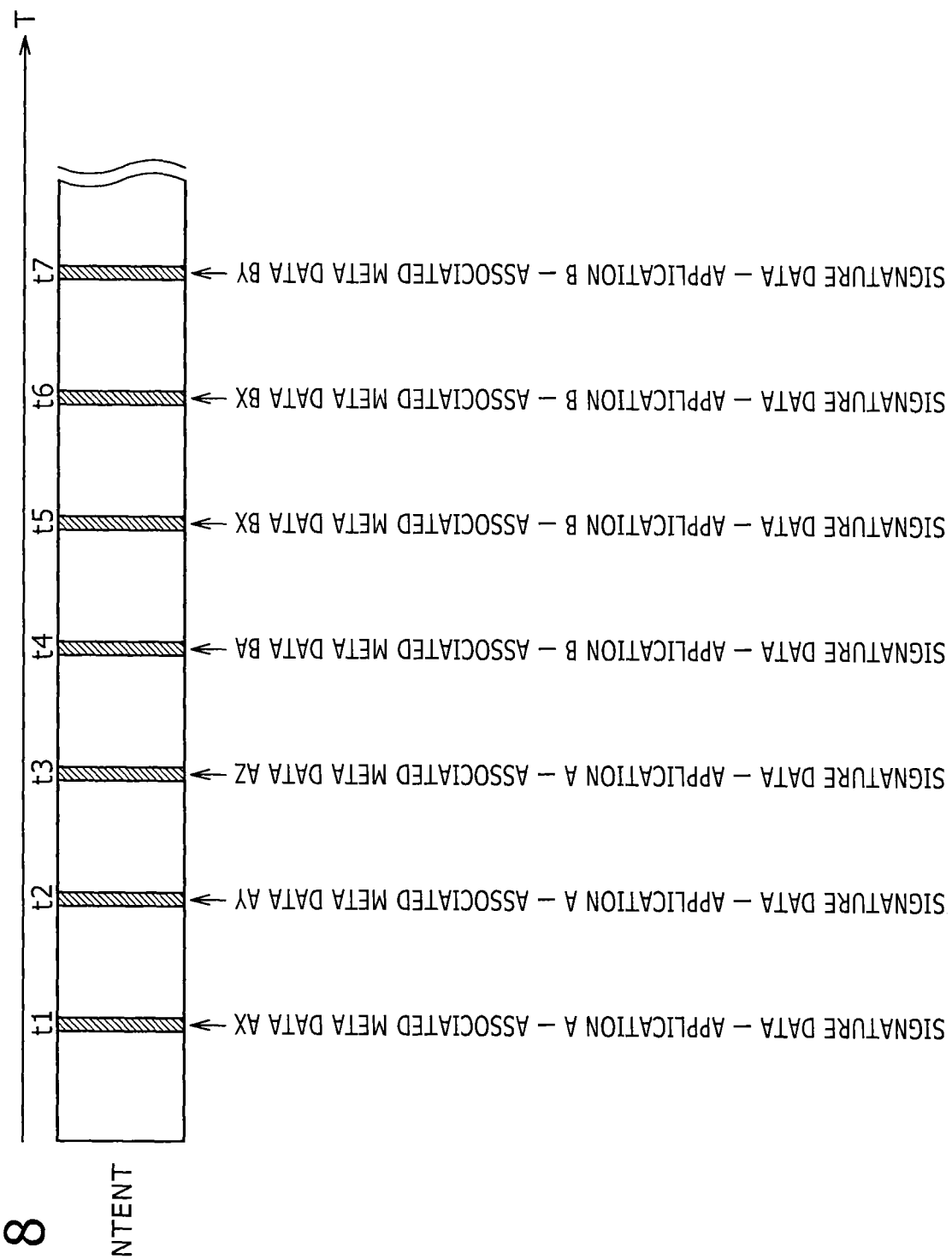

Referring to FIG. 8, there is shown a relation between the content, the signature data, the application, and the associated meta data that are related with each other by the ACR reference data 80 and the application schedule data 90. As shown in the figure, the signature data is extracted from the content on a periodic manner and can change applications when the progression of the same content is continuing. In addition, the signature data can give different pieces of associated meta data to the application being executed.

It should be noted that the ACR reference data 80 held in the ACR database 53 and the application schedule data 90 held in the application database 63 may be integrated to be held at least in one of the ACR server 31 and the application server 33.

[Data Structure of ACR Response]

Referring to FIG. 9, there are shown data structures of an ACR response generated by the ACR response generating block 55 of the ACR server 31.

Figure 9A:
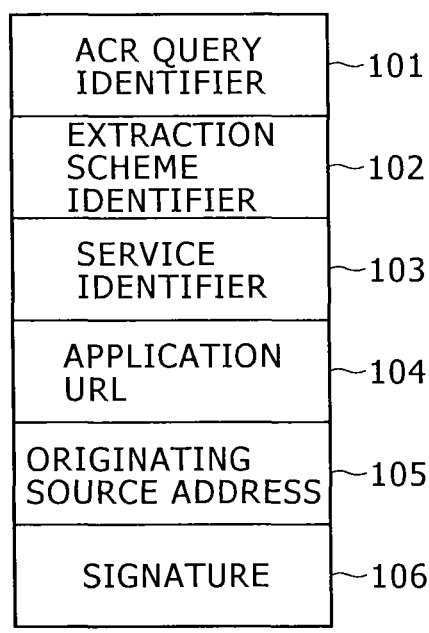
FIGS. 9A-9B are diagrams illustrating a data structure of an ACR response.
Figure 9B:
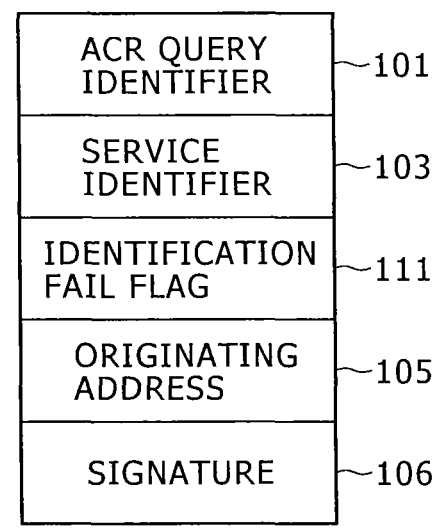

It should be noted that FIG. 9A shows the data structure of an ACR response when the content from which the signature data 74 of the ACR query 70 transmitted from the ACR client 22 has been identified, namely, the content being viewed on the terminal apparatus 20 has been identified. FIG. 9B shows the data structure of an ACR response when the content has not been identified.

An ACR response 100 in the case where the content being viewed on the terminal apparatus 20 shown in FIG. 9A includes an ACR query identifier 101, an extraction method identifier 102, a service identifier 103, an application URL 104, an originating address 105, and a signature 106.

An ACR response 100 in the case where the content being viewed on the terminal apparatus 20 shown in FIG. 9B has not been identified includes the ACR query identifier 101, a service identifier 103, an originating address 105, the signature 106, an identification fail flag 111.

The ACR query identifier 101, the extraction method identifier 102, and the service identifier 103 are used to identify the ACR query 70 that was a trigger for the generation of the ACR response 100 concerned. For these identifiers, the ACR query identifier 71, the extraction method identifier 72, and the service identifier 73 of the corresponding ACR query 70 can be used.

The application URL (Uniform Resource Locator) 104 is indicative of an application to be executed in link with the progression of the identified content and also indicative of the acquisition destination (the application server 33) of this application. The application URL 104 will be described later with reference to FIGS. 10A-10B.

The application URL 105 is an address on the Internet 12 of the ACR server 31 that transmits the ACR response 100 concerned. The signature 106 is used to prevent the ACR response 100 concerned from being tampered on the communication route. It should be noted that the entire ACR response 100 may be encrypted to be transmitted, thereby preventing tampering.

The identification fail flag 111 is indicative that the content from which the signature data 74 included in the ACR query 70 has been extracted in the ACR server 31, namely, the content being viewed on the terminal apparatus 20 has not been identified.

[Example of the Application URL 104]

FIGS. 10A-10B shows two types of description examples of the application URL 104 included in the ACR response 100.

As shown in the figure, the application URL 104 is written in the same manner as a URL indicative of the location of data or the like on the Internet 12. The first half of the application URL 104 "http://xxxx.com/applocation" is equivalent to the acquisition source and application identifier of each application. The last half of the application URL 104 describes a query character string.

In the description example of the application URL 104 shown in FIG. 10A, a query character string is made up of clientLocalTime, contentID, contentTime, and startTime.

On the other hand, in the description example of the application URL 104 shown in FIG. 10B, a query character string is made up of clientLocalTime, contentID, and contenTime.

clientLocalTime is indicative of a timing with which a corresponding signature data has been extracted from the content in a local system clock of the terminal apparatus 20, for which the extraction local time stamp 75 of the ACR query 70 is used. contentID is indicative of the content from which signature data has been extracted, for which the content identifier 82 of the ACR reference data 80 is used.

contentTime is indicative of a timing with which corresponding signature data has been extracted from the content, in a content reproduction time, for which the reproduction time 83 of the ACR reference data 80 is used. startTime describes the execution timing of the application indicated by the first half of the application URL 104 in content reproduction time.

It should be noted that, for the application URL 104, one of the description examples shown in FIG. 10A and FIG. 10B is employed. The following describes a difference in the operation of the linking application supply system 10 between the case where the description example of FIG. 10A is used and the case where the description example of FIG. 10B is used.

[Operation by the Linking Application Supply System 10]

Figure 11:
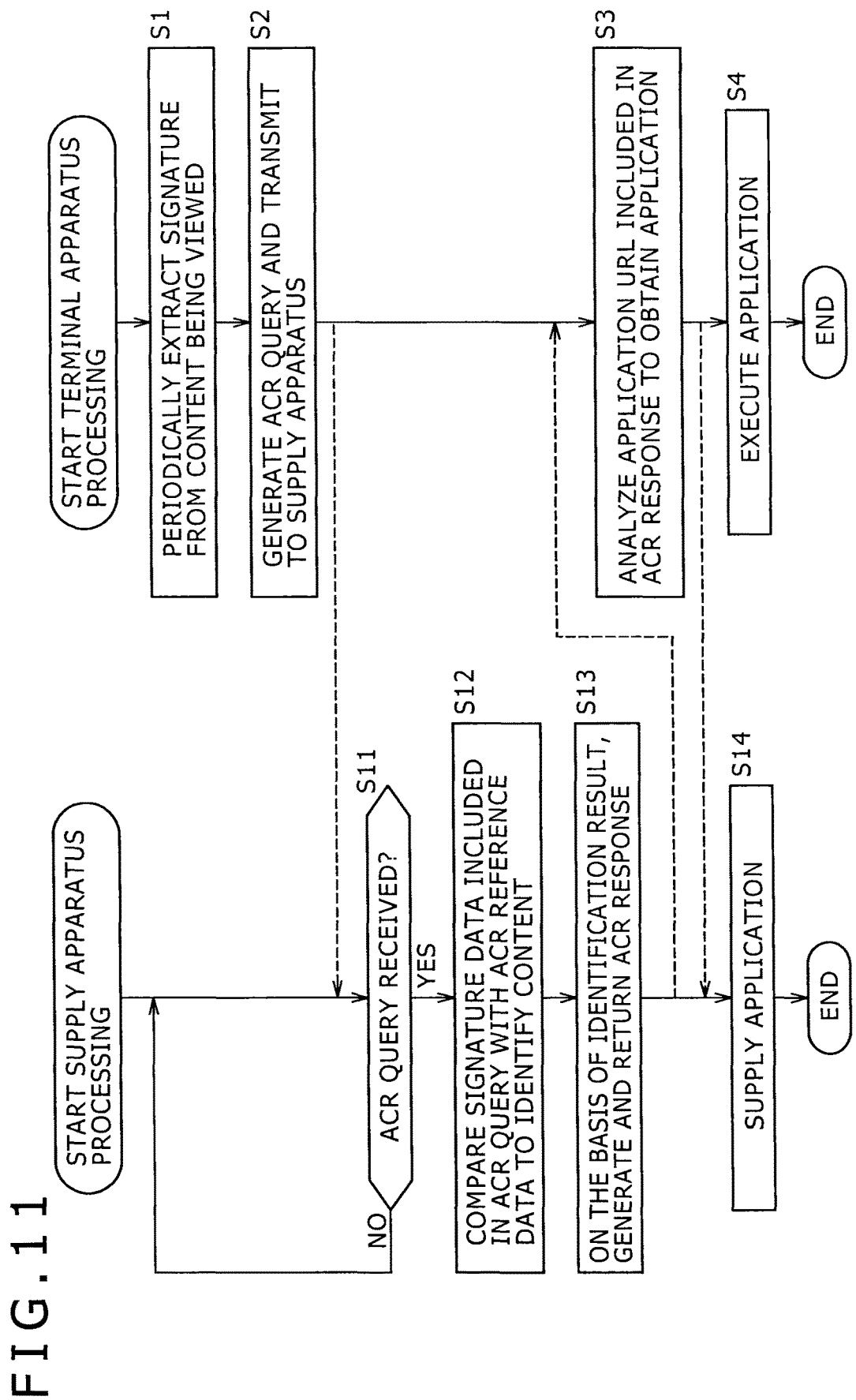
FIG. 11 is a flowchart indicative of a first exemplary operation of the linking application supply system.

Referring to FIG. 11, there is shown a flowchart indicative of an operation (hereafter referred to as a first operation) of the linking application supply system 10 that is executed when the description example shown in FIG. 10A is used for the application URL 104.

It is assumed, for the premises of the first operation, that the already generated ACR reference data 80 be held in the ACR database 53 of the ACR server 31 configuring the supply apparatus 30 and the application schedule data 90 be held in the application database 63 of the application server 33.

Content is reproduced by a TV receiver in which the terminal apparatus 20 is incorporated. To be more specific, when the user views content on the TV receiver, the content renderer 21 of the terminal apparatus 20 branches the content being viewed and outputs the branched content to the ACR client 22 in step S1. In the ACR client 22, the signature extracting block 41 extracts signature data from the content being viewed with a predetermined sampling period and outputs the extracted content to the ACR query generating block 42.

In step S2, the ACR query generating block 42 generates an ACR query 70 including the signature data entered from the signature extracting block 41 and outputs the generated ACR query 70 to the communication block 43. The communication block 43 transmits the received generated ACR query 70 to the ACR server 31 of the supply apparatus 30 via the Internet 12.

On the other hand, in step S11, the ACR server 31 of the supply apparatus 30 waits until the ACR query 70 transmitted from the ACR client 22 of the terminal apparatus 20 is received by the communication block 54. When the ACR query 70 is received by the communication block 54, the procedure goes to step S12.

In step S12, the ACR response generating block 55 references the ACR reference data 80 of the ACR database 53 to identify content corresponding to the signature data 74 included in the ACR query 70.

In step S13, the ACR response generating block 55 generates an ACR response 100 in accordance with a content identification result. To be more specific, if the content corresponding to the signature data 74 included in the ACR query 70 has been identified, the ACR response 100 indicated in FIG. 9A is generated; otherwise, the ACR response 100 indicated in FIG. 9B is generated. The communication block 54 transmits the generated ACR response 100 to the ACR client 22 of the terminal apparatus 20 via the Internet 12.

When this ACR response 100 is received and held by the ACR client 22, then, in step S3, the ACR response analyzing block 45 analyzes the application URL 104 included in the held ACR response 100 to make the application manager 23 obtain the application to be ready in time for the execution start timing (startTime in the query character string of the application URL 104) of the application to be executed in link with the progression of the content being viewed.

Figure 12:
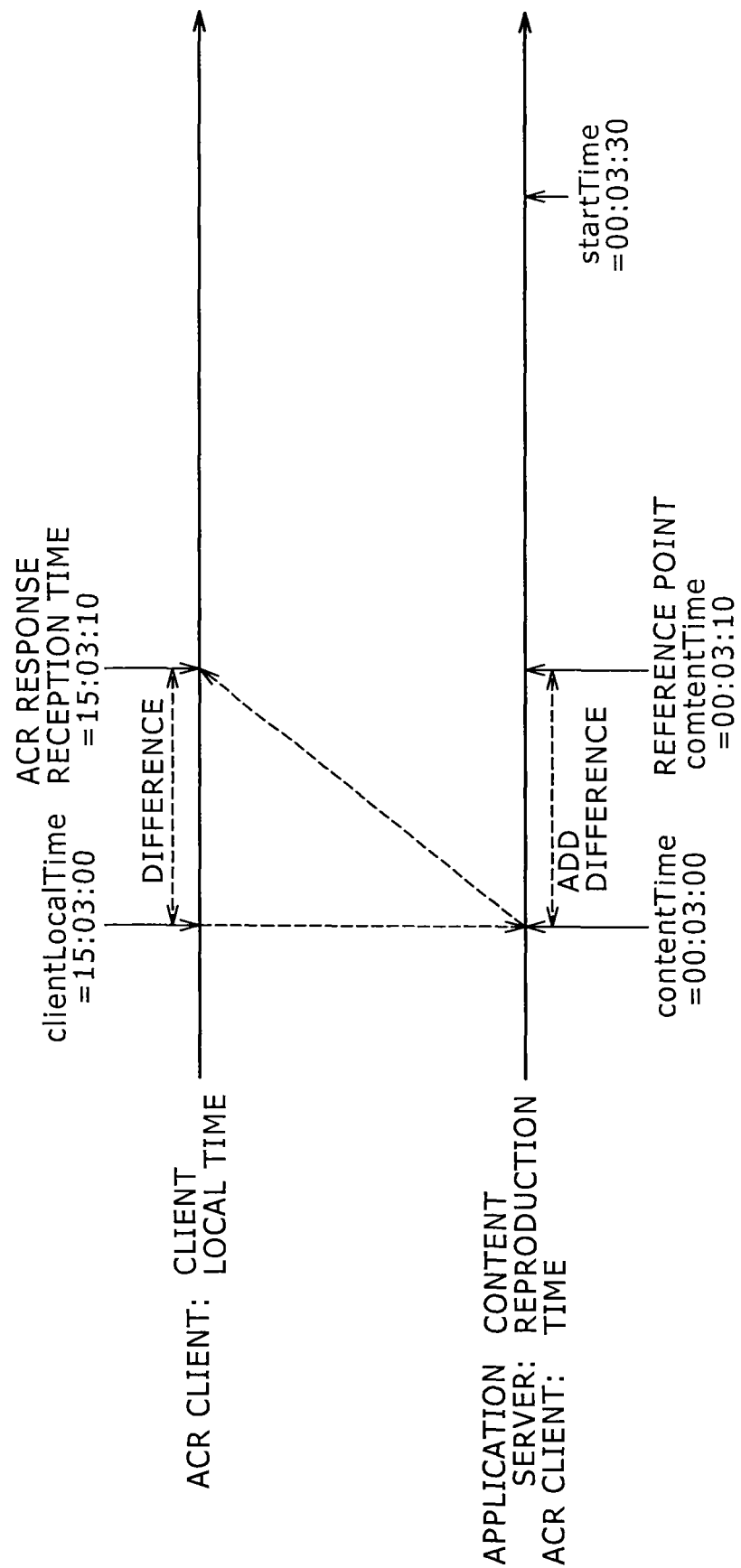
FIG. 12 is a diagram illustrating the first exemplary operation of the linking application supply system.

To be more specific, as shown in FIG. 12, the reception time of the ACR response 100 in the client local time of the terminal apparatus 20 is obtained and clientLocalTime in the query character string of the application URL 104 is subtracted from the obtained reception time. A difference obtained by this subtraction is equivalent to a time from the extraction of signature data in the ACR client 22 to the reception of the ACR response 100, so that adding this difference to contenTime in the query character string allows the reception timing of the ACR response 100 on the content reproduction time axis to be recognized as a reference point. Then, because an interval between this reference point and the starTime in the query character string provides a temporal margin, the application manager 23 obtains the application by use of this temporal margin.

By transmitting the application URL 104 to the Internet 12, the application manager 23 obtains a corresponding application. To be more specific, in step S14, the application regenerating block 62 of the application server 33 reads an application corresponding to the application identifier indicated in the first half of the application URL 104 from the application database 63 and outputs the obtained application to the communication block 61. The communication block 61 supplies this application to the application manager 23. Namely, in this case, the regeneration of application is not executed by the application regenerating block 62.

It should be noted that the execution of the same operation as above by another terminal apparatus 20 in advance may have cached the corresponding application in a proxy server on the Internet 12. If this happens, because the application URL 104 is written by URL, the application already cached in the proxy server is supplied to the application manager 23. In this case, no access is executed to the application server 33, so that the processing load on the side of the supply apparatus 30 can be mitigated.

In step S4, the application manager 23 executes the obtained application when the progression of the content reaches startTime in the query character string.

The processing of each of the steps described above is repetitively executed while the content is being viewed. Consequently, the operation of the application in link with the progression of the content being viewed is enabled.

Then, depending on the type of an application to be linked, information associated with the content can be displayed, viewer participating quiz or voting can be realized, and other pieces of content can be recommended or downloaded.

Figure 13:
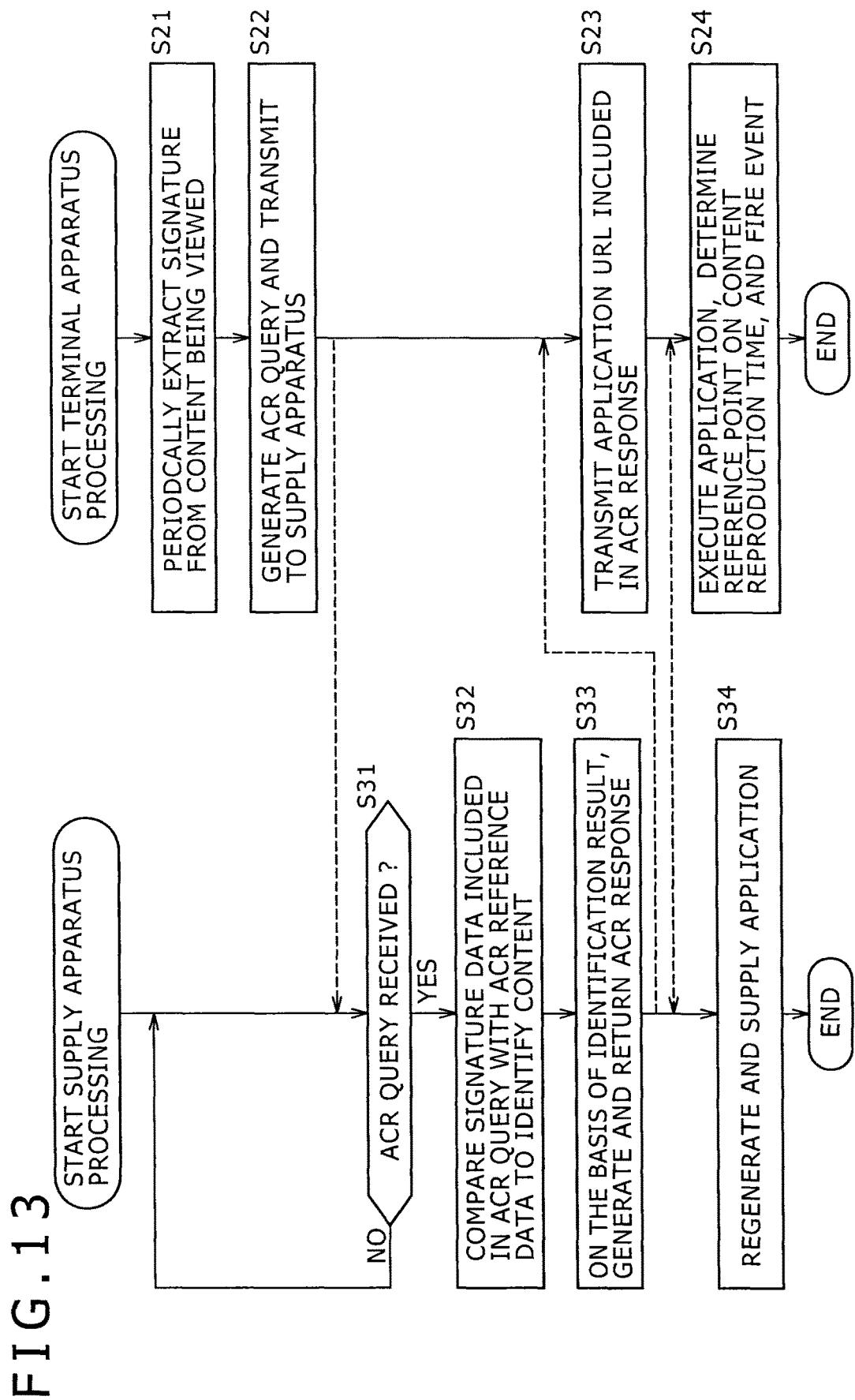
FIG. 13 is a flowchart indicative of a second exemplary operation of the linking application supply system.

Referring to FIG. 13, there is shown a flowchart indicative of an operation (hereafter referred to as a second operation) of the linking application supply system 10 that is executed when the description example shown in FIG. 10B is employed for the application URL 104.

It should be noted that the premises for the second operation concerned are the same as those for the first operation described above. The processing of steps S21 and S22 by the terminal apparatus 20 in the second operation is the same as the processing of steps S1 and S2 by the terminal apparatus 20 in the first operation. The operation of steps S31 through S33 by the supply apparatus 30 in the second operation is the same as the processing of steps S11 through S13 by the supply apparatus 30 in the first operation, so that the descriptions of these processing operations are skipped. Therefore, the second operation will be described starting with the processing of step S23.

When the ACR server 31 returns an ACR response 100, the ACR client 22 receives the ACR response 100 and holds the received ACR response 100 in the ACR database 53 in step S23. The ACR response analyzing block 45 analyzes the application URL 104 included in the held ACR response 100 and outputs the application URL 104 included therein to the application manager 23. The application manager 23 transmits the received application URL 104 to the application server 33 via the Internet 12.

On the other hand, in the application server 33, application regenerating block 62 reads the application corresponding to the application identifier indicated by the first half of the application URL 104 from the application database 63 in step S34. At the same time, the application regenerating block 62 reads, from the query character string of the application URL 104, contentTime, indicated by content reproduction time, indicative of the timing with which the signature data has been extracted from the content. Further, the application regenerating block 62 outputs, to the communication block 61, the application read from the application database 63 by executing application regeneration such as adjusting the execution timing of the application and the event fire timing in the executed application later than the time indicated in contentTime, for example. The communication block 61 supplies the regenerated application to the application manager 23.

In step S24, the application manager 23 receives the regenerated application and immediately executes the received application.

Figure 14:
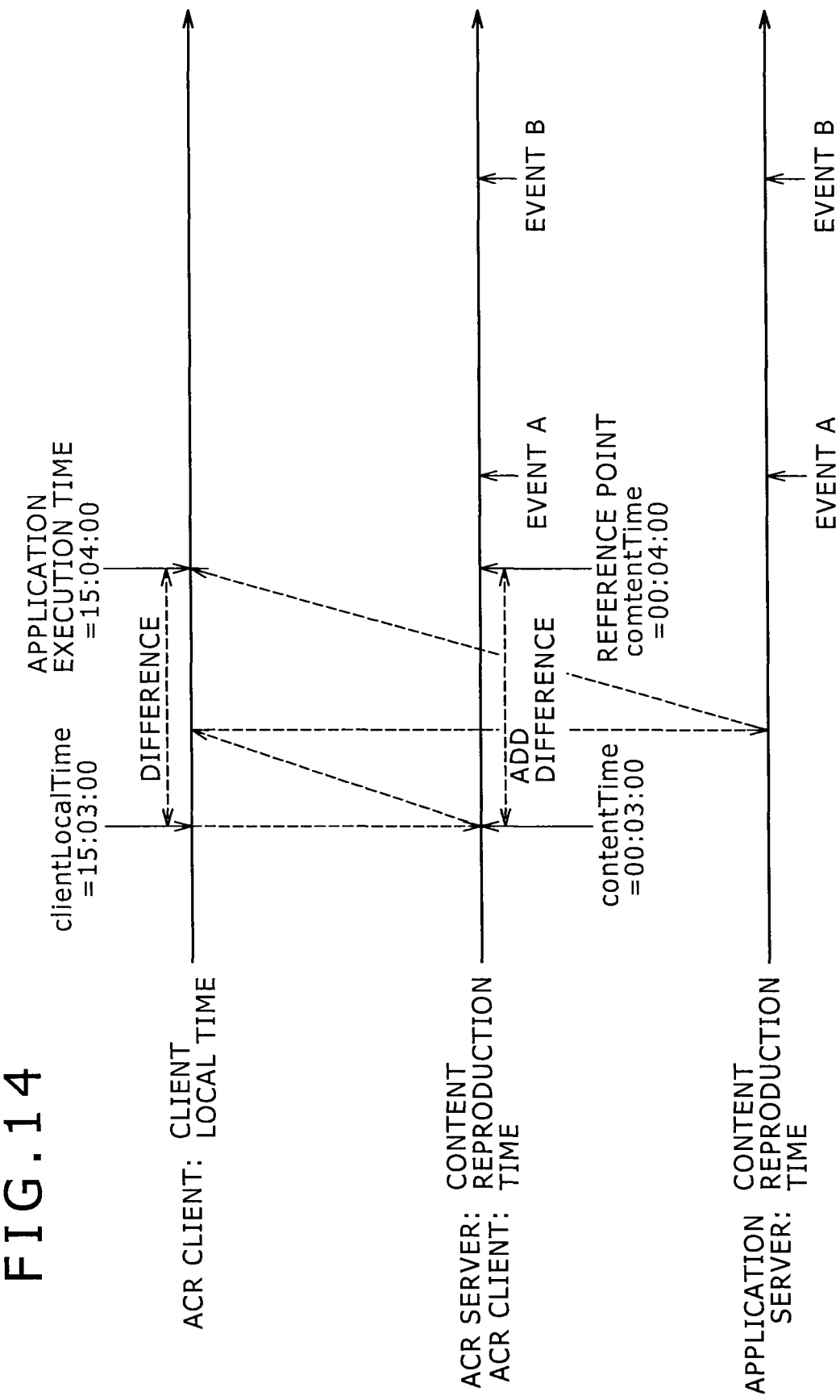
FIG. 14 is a diagram illustrating the second exemplary operation of the linking application supply system.

To be more specific, as shown in FIG. 14, the execution time of the regenerated application at the client local time of the terminal apparatus 20 is obtained and clientLocalTime in the query character string of the application URL 104 is subtracted from the obtained execution time. A difference obtained as a result of this subtraction is equivalent to the time from the extraction of the signature data in the ACR client 22 to the acquisition and execution of the corresponding application, so that a reference point is determined by adding this difference to contentTime in the query character string. Then, in the application being executed, an event is fired with a timing with the determine reference point set as reference.

The processing of each of the steps described above is repetitively executed while the content is being viewed. Consequently, the operation of the application in link with the progression of the content being viewed is enabled.

Depending on the type of an application to be linked, information associated with the content can be displayed, viewer participating quiz or voting can be realized, and other pieces of content can be recommended or downloaded.

The terminal apparatus 20 and the supply apparatus 30 that execute the above-mentioned sequence of processing operations can be realized by executing software by a computer in addition to hardware configurations. When the above-mentioned sequence of processing operations is executed by software, the programs constituting the software are installed in a computer which is built in dedicated hardware equipment or installed, from a network or recording media, into a general-purpose personal computer for example in which various programs may be installed for the execution of various functions.

Referring to FIG. 15, there is shown a block diagram illustrating an exemplary hardware configuration of the above-mentioned computer.

In a computer 200, a CPU (Central Processing Unit) 201, a ROM (Read Only Memory) 202, and a RAM (Random Access Memory) 203 are interconnected by a bus 204.

The bus 204 is connected to an input/output interface 205. The input/output interface 205 is connected to an input block 206, an output block 207, a recording block 208, a communication block 209, and a drive 210.

The input block 206 is made up of a keyboard, a mouse, and a microphone, for example. The output block 207 is made up of a display and a speaker, for example. The recording block 208 is made up of a hard disk drive or a nonvolatile memory, for example. The communication block 209 is made up of a network interface for example. The drive 210 drives a removable media 211, such as a magnetic disk, an optical disk, a magneto-optical disk, or a semiconductor memory.

In the computer 200 configured as described above, the CPU 201 loads a program from the recording block 208 into the RAM 203 through the input/output interface 205 and the bus 204 and executes the loaded program, thereby executing the sequence of processing operations described above.

Programs to be executed by the computer 200 (or the CPU 201) can be provided as recorded to the removable media 211 that is package media for example. At the same time, programs can be provided through wireless or wired transmission media, such as a local area network, the Internet, or digital satellite broadcasting.

In the computer 200, a program can be installed into the recording block 208 via the input/output interface 205 by loading the removable media 211 in which the program is stored onto the drive 210. Also, a program can be received at the communication block 209 via wireless or wired transmission media and the received program can be installed in the recording block 208. Besides, a program can be installed in the ROM 202 or the recording block 208 in advance.

It should be noted that a program to be executed by the computer 200 can be executed in a time-dependent manner along a sequence described herein or in parallel or on an on-demand basis.

While preferred embodiments of the present disclosure have been described using specific terms, such description is for illustrative purpose only, and it is to be understood that changes and variations may be made without departing from the spirit or scope of the following claims.

DESCRIPTION OF REFERENCE SYMBOLS

10: Linking application supply system, 20: Terminal apparatus, 21: Content renderer, 22: ACR client, 23: Application manager, 24: User interface, 30: Supply apparatus, 31: ACR server, 32: Content server, 33: Application server, 41: Signature extracting block, 42: ACR query generating block, 43: Communication block, 44: Holding block, 45: ACR response analyzing block, 51: Content acquiring block, 52: Signature extracting block, 53: ACR database, 54: Communication block, 55: ACR response generating block, 61: Communication block, 62: Application regenerating block, 63: Application database, 70: ACR query, 80: ACR reference data, 90: Application schedule data, 100: ACR response, 200: Computer, 201: CPU
[Selected Drawing]FIG. 2
In the drawings:
[FIG. 1]
30: Supply apparatus
32: Content server
Content
31: ACR server
33: Application server
ACR response
Application
11: Broadcast network
12: Internet
ACR query application URL
20-1: Terminal apparatus
21: Content renderer
22: ACR client
23: Application manager
24: User interface
10: Linking application supply system
[FIG. 2]
41: Signature extracting block
42: ACR Query generating block
43: Communication block
44: Holding block
45: ACR response analyzing block
22: ACR client
[FIG. 3]
51: Content acquiring block content
52: Signature extracting block
53: ACR database
54: Communication block
55: ACR response generating block
31: ACR server
[FIG. 4]
62: Application regenerating block
61: Communication block
63: Application database
33: Application server
[FIG. 5/9]
71/101: ACR query identifier
72/102: Extraction scheme identifier
73/103: Server identifier
74: Signature data
75: Extraction local time stamp
76/105: Origination source address
77/106: Signature 70: ACR query
104: Application URL
100: ACR response
111: Identification fail flag
[FIG. 6]
81: Signature data
82: Content identifier
83: Reproduction time
84: Application identifier
80: ACR reference data
[FIG. 7]
91: Content identifier
92: Reproduction time
93: Application
94: Associated meta data
90: Application schedule data
[FIG. 8]
Content
Signature data
Application
Associated meta data
[FIGS. 9A-9B]
Query character string
[FIG. 11/13]
Start supply apparatus processing
S11/S31: ACR query received?
S12/S32: Compare signature data included in ACR query with ACR reference data to identify content.
S13/S33: On the basis of identification result, generate and return ACR response.
S14: Supply application.
End
Start terminal apparatus processing
S1/S21: Periodically extract signature from content being viewed.
S2/S22: Generate ACR query and transmit to supply apparatus.
S3: Analyze application URL included in ACR response to obtain application.
S4: Execute application.
END
S34: Regenerate and supply application.
S23: Transmit application URL included in ACR response.
S24: Execute application, determine reference point on content reproduction time, and fire event.
[FIG. 12/14]
ACR client
ACR client: client local time
ACR response reception time
Difference
Application server
Content reproduction time
Add difference
Reference point
Application execution time
ACR server
Event A
[FIG. 15]
204: Bus
205: Input/output interface
206: Input block
207: Output block
208: Storage block
209: Communication block
210: Drive
211: Removable media
200: Computer

The invention claimed is:

1. A reception apparatus comprising:
circuitry configured to
output content for display to a user;
extract signature data from the content based on a watermark embedded in, or a finger print of, the content that is output for display to the user;
generate a query based on the signature data, the query including an extraction time of the signature data;
transmit the generated query to a server apparatus;
receive a response to the generated query from the server apparatus, the response to the generated query including a data structure that includes both an application URL (Uniform Resource Locator) and content reproduction time information;
obtain an application based on the application URL and the content reproduction time information; and
execute the application in synchronization with the display of the content.

2. The reception apparatus according to claim 1, wherein the circuitry is configured to
obtain the application via the Internet.

3. The reception apparatus according to claim 1, wherein the application URL indicates a location of the application on the Internet.

4. A method of a reception apparatus for executing an application, comprising:
outputting content for display to a user;
extracting, by circuitry of the reception apparatus, signature data from the content based on a watermark embedded in, or a finger print of, the content that is output for display to the user;
generating, by the circuitry, a query based on the signature data, the query including an extraction time of the signature data;
transmitting, by the circuitry, the generated query to a server apparatus;
receiving a response to the generated query from the server apparatus, the response to the generated query including a data structure that includes both an application URL (Uniform Resource Locator) and content reproduction time information;
obtaining an application based on the application URL and the content reproduction time information; and
executing the application in synchronization with the display of the content.

5. The method according to claim 4, further comprising:
obtaining the application via the Internet.

6. The method according to claim 4, wherein
the application URL indicates a location of the application on the Internet.

7. A non-transitory computer-readable storage medium storing a program which when executed by a computer causes the computer to:
output content for display to a user;
extract signature data from the content based on a watermark embedded in, or a finger print of, the content that is output for display to the user;
generate a query based on the signature data, the query including an extraction time of the signature data;
transmit the generated query to a server apparatus;
receive a response to the generated query from the server apparatus, the response to the generated query including a data structure that includes both an application URL (Uniform Resource Locator) and content reproduction time information;

obtain an application based on the application URL and the content reproduction time information; and execute the application in synchronization with the display of the content.

8. The reception apparatus according to claim 1, wherein the content, from which the signature data is extracted, is associated with a single content identifier.

9. The method according to claim 4, wherein the content, from which the signature data is extracted, is associated with a single content identifier.

10. The reception apparatus according to claim 1, wherein the circuitry is configured to execute the application in synchronization with the display of the content based on a plurality of time information, the plurality of time information including the extraction time of the signature data corresponding to a client local time of the reception apparatus at which the signature data is extracted.

11. The method according to claim 4, wherein the executing comprises:

executing the application in synchronization with the display of the content based on a plurality of time information, the plurality of time information including the extraction time of the signature data corresponding to a client local time of the reception apparatus at which the signature data is extracted.

12. The reception apparatus according to claim 1, wherein the circuitry is configured to execute the application in synchronization with the display of the content based on a plurality of time information and a difference between a time that the response to the generated query is received and the extraction time of the signature data.

13. The reception apparatus according to claim 1, further comprising:

a television tuner configured to receive a digital broadcast signal including the content; and a display configured to display the content.

14. The reception apparatus according to claim 1, wherein the response to the generated query is a single response string that includes the content reproduction time information and the application URL.

15. The method according to claim 4, wherein the executing comprises:

executing the application in synchronization with the display of the content based on a plurality of time information and a difference between a time that the response to the generated query is received and the extraction time of the signature data.

16. The method according to claim 4, wherein the response to the generated query is a single response string that includes the content reproduction time information and the application URL.

17. The reception apparatus according to claim 1, wherein the application URL includes a query string.

18. The method according to claim 4, wherein the application URL includes a query string.

19. The reception apparatus according to claim 17, wherein the query string includes the content reproduction time information.

20. The reception apparatus according to claim 1, wherein the application URL is generated in accordance with the content reproduction time information.

* * * * *